United States Patent [19]

Mullins et al.

[11] 4,138,066
[45] Feb. 6, 1979

[54] FOOD GRINDER

[75] Inventors: Keith M. Mullins; Thomas K. Leppert; Thomas Cannon; Ronald R. Kerr; Ronn G. Smith, all of Ft. Collins, Colo.

[73] Assignee: Teledyne Industries, Inc., Ft. Collins, Colo.

[21] Appl. No.: 792,601

[22] Filed: May 2, 1977

[51] Int. Cl.² .................. A47J 44/00; B02C 18/30
[52] U.S. Cl. ............................ 241/86; 241/82.5; 241/282.1
[58] Field of Search ............. 241/82.1, 83, 84, 86, 241/282.1, 100, 82.5, 92, 199.12

[56] References Cited

U.S. PATENT DOCUMENTS

| 2,106,711 | 2/1938 | Berkman | 241/92 |
|---|---|---|---|
| 2,284,155 | 5/1942 | Landgraf | 241/199.12 |
| 2,678,073 | 5/1954 | De Nardis | 241/92 |
| 2,801,665 | 8/1957 | Hortnagl | 241/86 |
| 2,805,697 | 9/1957 | Nieland | 241/282.1 |
| 2,977,056 | 3/1961 | Guutke | 241/282.1 |
| 3,032,087 | 5/1962 | Rodwick | 241/282.1 |
| 3,063,486 | 11/1962 | Ohms | 241/100 |
| 3,951,351 | 4/1976 | Ernster et al. | 241/282.1 |

*Primary Examiner*—Howard N. Goldberg
*Assistant Examiner*—Paul A. Bell
*Attorney, Agent, or Firm*—Hugh H. Drake

[57] ABSTRACT

A food grinder has an upstanding base unit within which is included an electric motor. A worm-driven gear linkage serves to deliver motion from the motor. Defined in one side of the base unit is a receptacle within which is received a cassette. The cassette includes a food grinding mechanism which receives motion from the linkage so as to operate that mechanism.

12 Claims, 26 Drawing Figures

FOOD GRINDER

The present invention relates to a food grinder. More particularly it pertains to a food grinder in which, for cleaning purposes, the food processing portion is readily removable from a motive drive assembly.

A wide variety of apparatus for grinding food is known. Such apparatus ranges from comparatively-small hand-operated units primarily for kitchen use to very large motor-driven machines employed commercially in butcher shops and the like. One common form of grinding mechanism features an apertured extrusion plate associated with cutting blades that sweep over the apertures as food is urged toward the plate by an auger. Usually, the cutting blades are carried on the end of a spindle which is so formed as also to constitute the auger. However, other cutting machanisms are known in which blades are carried by a gear-driven ring.

In some cases, particularly with the larger commercial apparatus, the grinding mechanism itself is removably mounted on a housing which carries the electric motor or other driving means. This facilitates cleaning the portion of the apparatus within which the food actually is processed and without having to move or otherwise handle the motive drive portion of the apparatus. Particularly in smaller grinding apparatus, such as that primarily intended for use in the home, it frequently is necessary substantially to dismantle the entire apparatus for purposes of cleaning. Often, various parts are threadably related as a result of which the dismantling for cleaning can at least be cumbersome and may in some instances become quite difficult should a threaded component become stuck. That may happen, for example, either as a result of improper assembly or by reason of residual foodstuff remaining from an earlier and insufficient cleaning of the components.

One use of a food grinder may be in the preparation of baby food. Commercially prepared baby food is relatively expensive as contrasted with the cost of the products from which it is made. Contributing to that cost is the desirability of marketing it in containers no larger than that which would constitute one or two servings. Many prior power-driven food grinders are just not convenient for use, as in the home, to grind only the small amount of material necessary to make a serving no more than adequate to satisfy one or two feedings of an infant.

It is one general object of the present invention to provide a new and improved food grinder which overcomes deficiencies and difficulties with apparatus such as that discussed above.

Another object of the present invention is to provide a food grinder which incorporates a new and improved ready detachability of the actual grinding mechanism from a motive power portion of the assembly.

A further object of the present invention is to provide a food grinder which, although driven by a contained electric motor, is compact and low in physical profile.

A particular object of the present invention is to provide a new and improved food grinder especially suited for repeated and frequent utilization, with cleaning inbetween of comparatively small quantities of food, as in the case of the grinding and the making of food suitable for the feeding of infants.

In accordance with one aspect of the present invention, a food grinder comprises an upstanding base unit within which is mounted a motor. Also mounted within the base unit are separate delivery means for transmitting motion from that motor. Further defined in the base unit is a horizontally facing receptacle. A cassette means, which includes an upright removable food grinding mechanism, is removably receivable within the receptacle for receiving motion from the delivery means to operate that mechanism only upon proper placement of the cassette means.

The features of the present invention which are believed to be novel are set forth with particularity in the appended claims. The organization and manner of the operation of the invention, together with further objects and advantages thereof, may best be understood by reference to the following description taken in connection with the accompanying drawings, in the several figures of which like reference numerals identify like elements, and in which:

The embodiment of the food grinder as herein depicted and described includes a base unit 30, a cassette 32 removably receivable within a receptacle 34 formed in base unit 30 to have a horizontally-facing opening 35, a barrel or food tube 36 that is receivable within a vertically oriented well 38 formed in cassette 32 and a plunger 40 receivable within tube 36 so as to force food toward well 38. Within well 38 is a food grinding mechanism 42 that comminutes food urged through tube 36 as the result of pressure upon the enlarged upper end 44 of plunger 40 and causes ground food to be dispensed into a container (not shown) placed beneath cassette 32 and below tube 36 as well as between forwardly-directed legs 46 and 47 that extend from the bottom portion of base unit 30.

Between usages, cassette 32 simply may be pulled laterally outward from base unit 30 so as to enable cleaning. The only food handling is by way of tube 36 and grinding mechanism 42. At most, only a gear within base unit 30, which is exposed upwardly within receptacle 34, need be cleaned. The remainder of the drive mechanism is concealed within the unit. Moreover, various arrangements to be described prevent the flow of food traffic from the grinding mechanism 42 toward the motive power source.

In use, the operator need only deposit the small quantity of food into the hopper defined by tube 36. With that tube secured into cassette 32, the latter is slid into receptacle 34 and plunger 40 is mounted on top of the foodstuff. Upon actuation of a switch 48 by the operator, grinder mechanism 42 is caused to operate and grind food to be delivered from cassette 32 and between legs 46 and 47. Thus, a container may be disposed between those legs to collect that ground foodstuff.

Figures 1, 2:
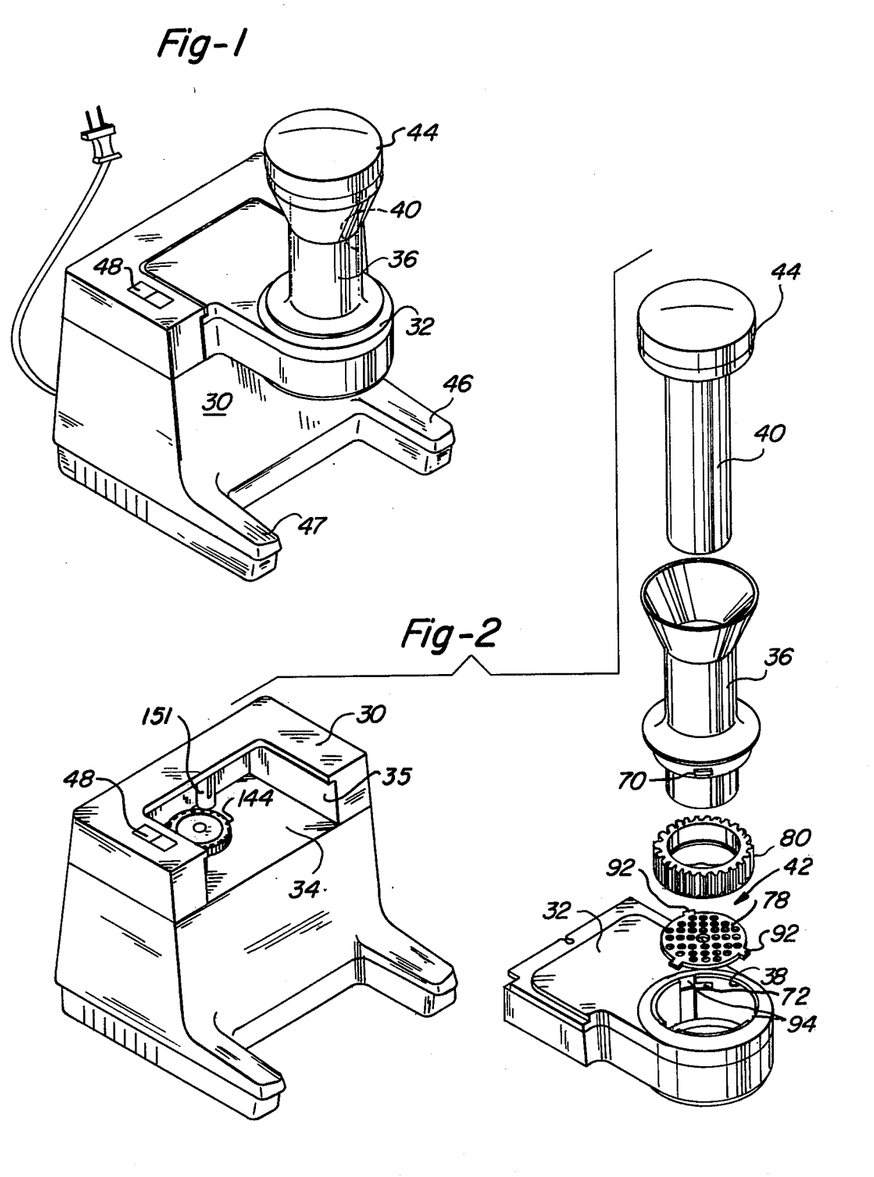
FIG. 1 is a perspective view of an assembled food grinder, in accordance with one embodiment of the present invention.
FIG. 2 is an exploded perspective view thereof.
Figure 3:
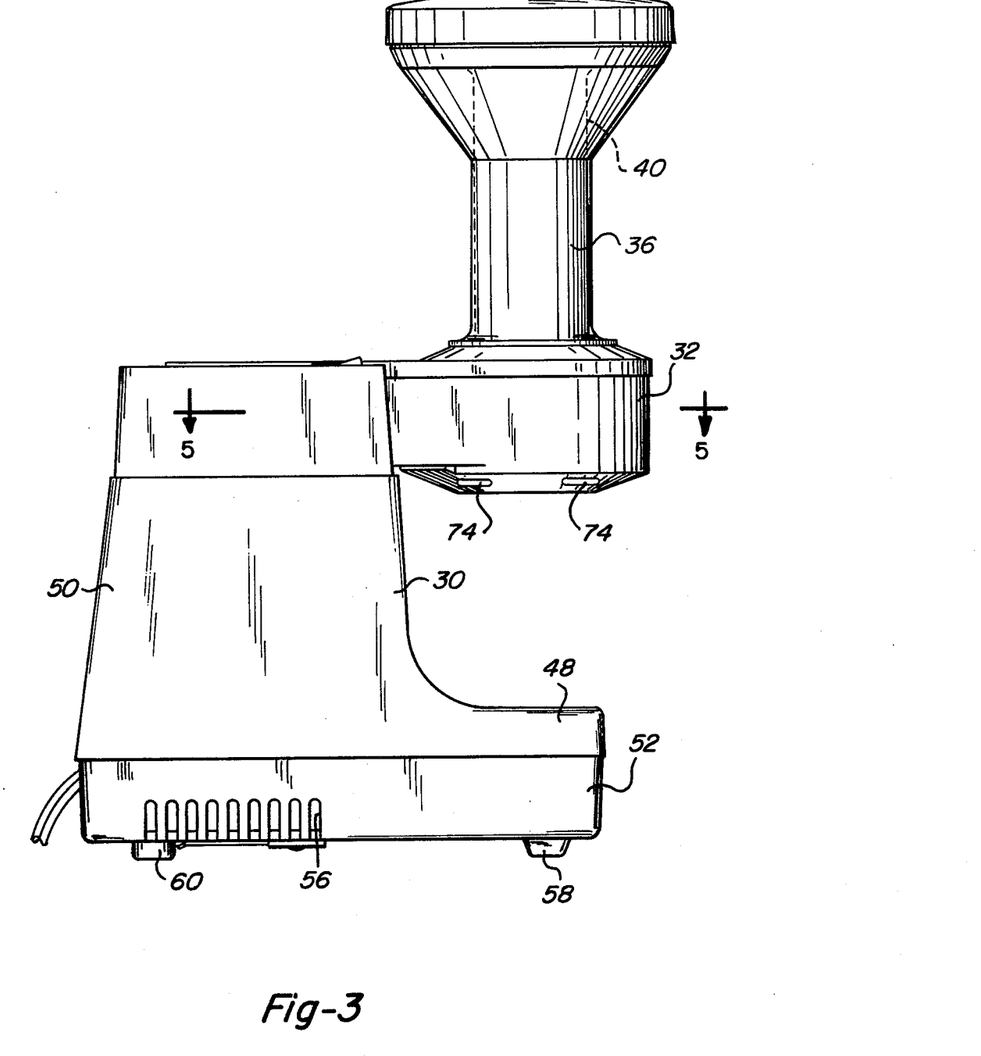
FIG. 3 is a side elevational view thereof.
Figure 4:
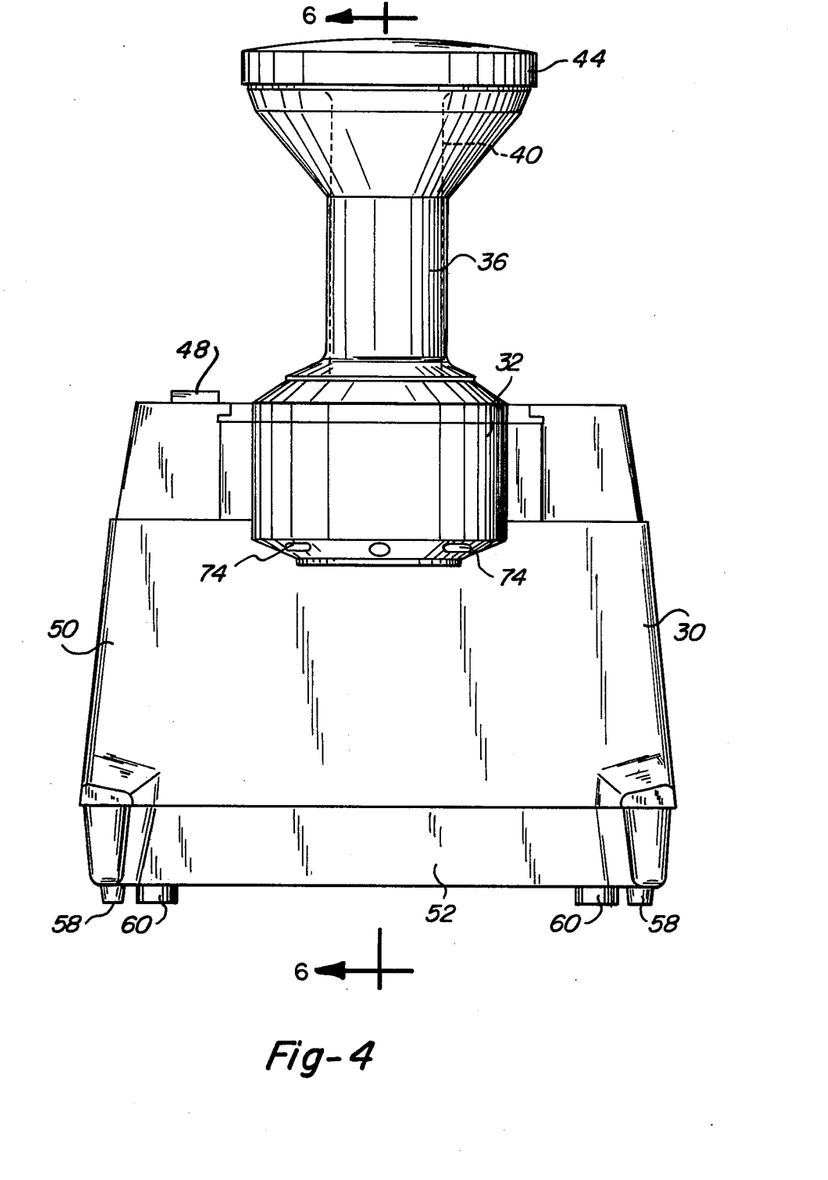
FIG. 4 is a front elevational view thereof.
Figure 5:
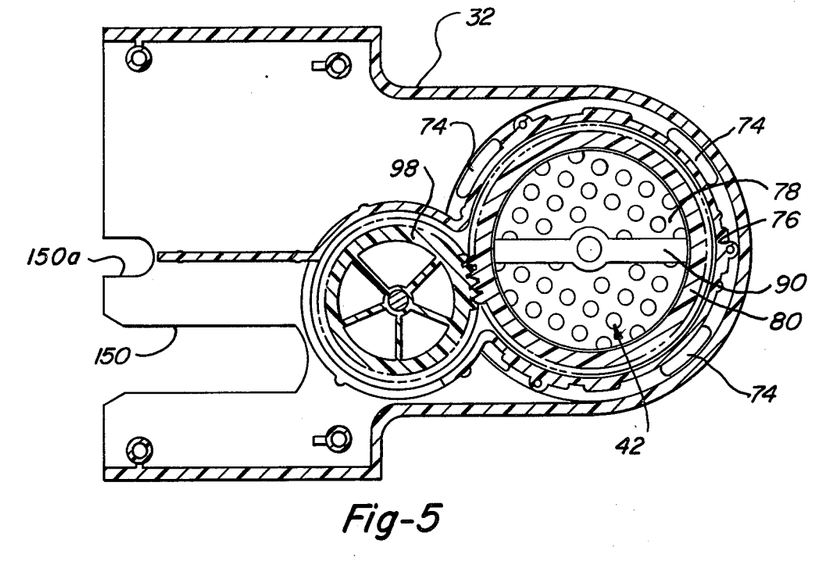
FIG. 5 is a cross-sectional view, partially broken away, taken along line 5—5 in FIG. 3.
Figure 6:
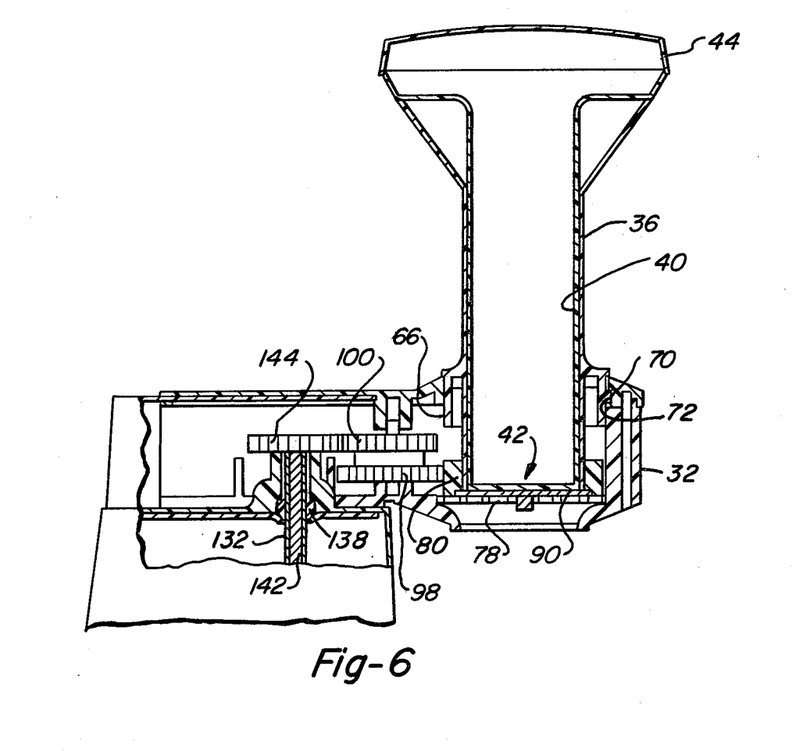
FIG. 6 is a fragmentary cross-sectional view taken generally along the line 6—6 in FIG. 4.
Figure 7:
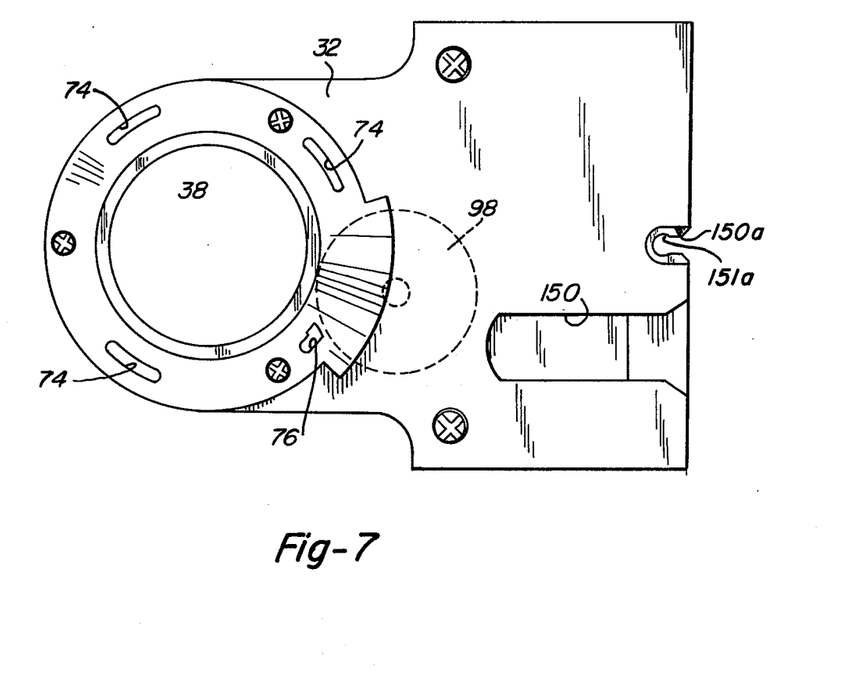
FIG. 7 is a bottom plan view of a component included in the grinder of FIG. 1.
Figure 8:
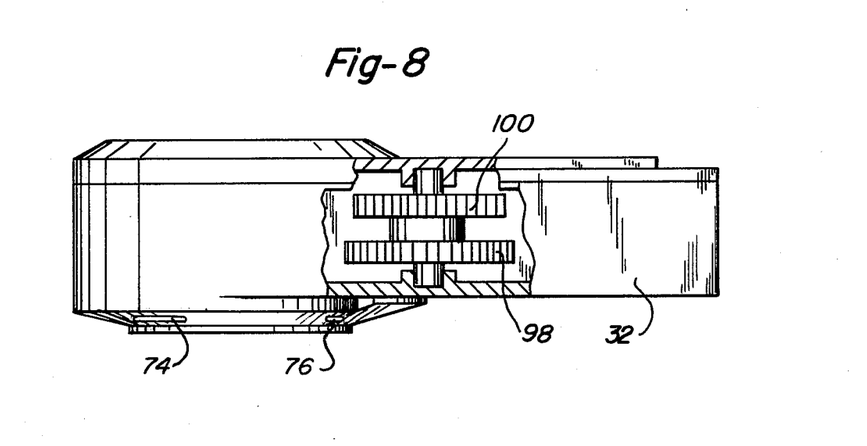
FIG. 8 is a side-elevational view, partially broken away, of a component shown in FIG. 7.
Figure 9:
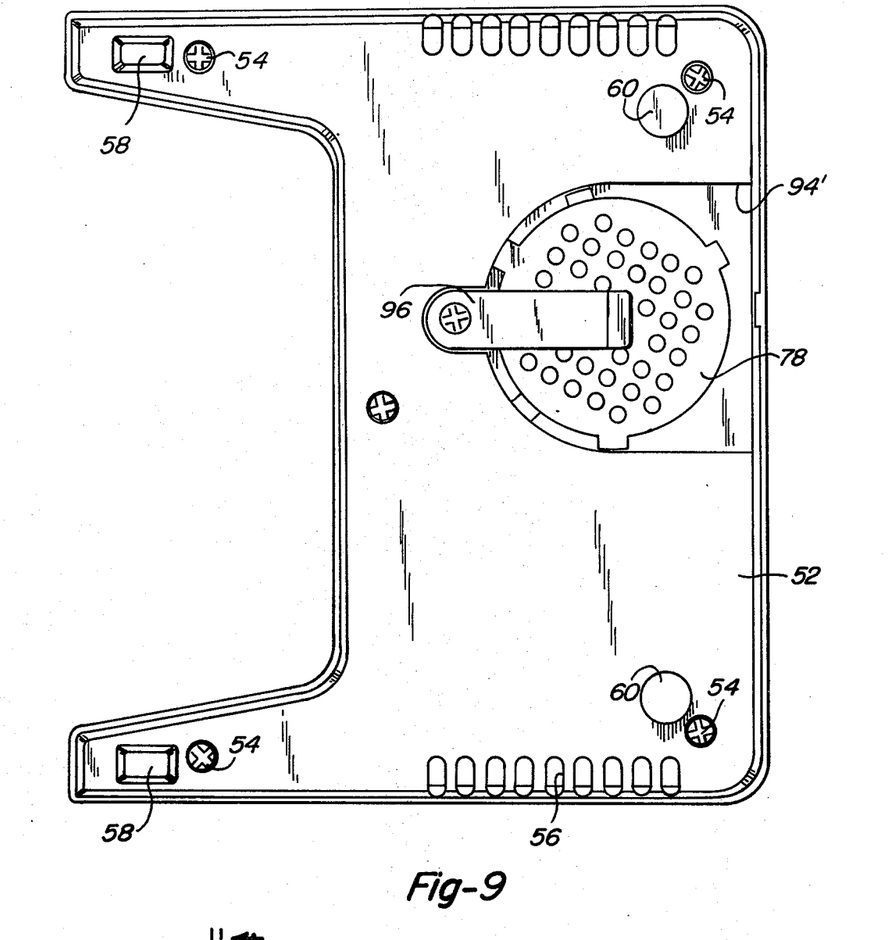
FIG. 9 is a bottom plan view of another component of the grinder of FIG. 1, a component which serves as a base unit.
Figure 10:
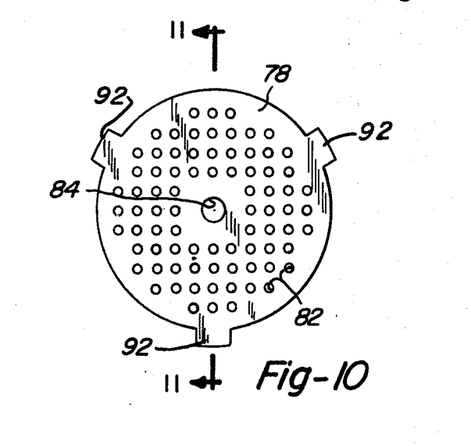
FIG. 10 is a top plan view of still another component included in the grinder of FIG. 1.
Figure 11:
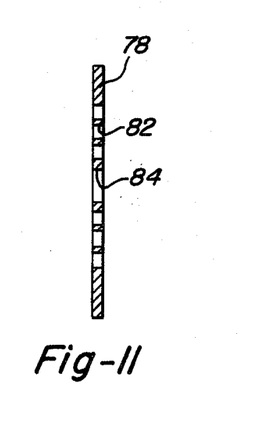
FIG. 11 is a cross-sectional view taken along the line 11—11 in FIG. 10.
Figure 12:
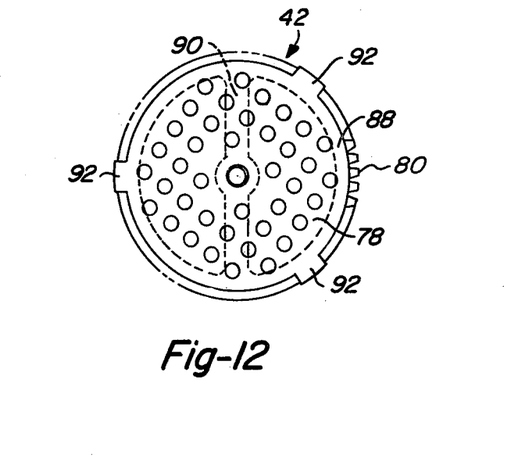
FIG. 12 is a bottom plan view of a grinding mechanism included within the grinder of FIG. 1.
Figure 13:
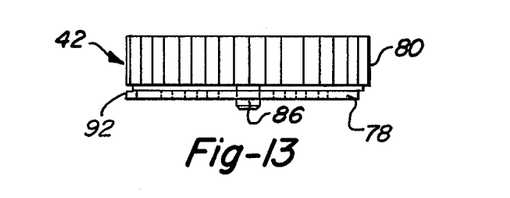
FIG. 13 is a side elevational view of the mechanism shown in FIG. 12.
Figure 14:
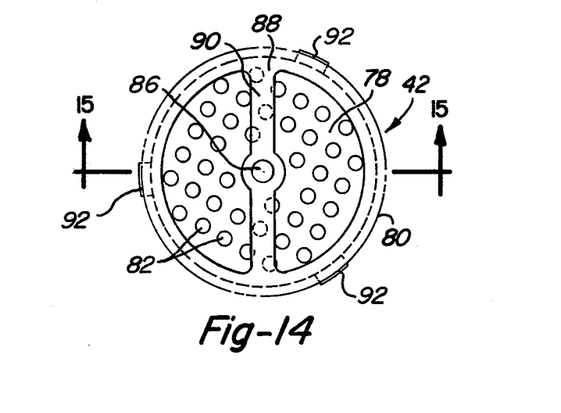
FIG. 14 is a top plan view of that same mechanism.
Figure 15:
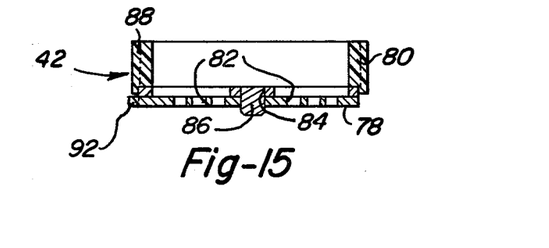
FIG. 15 is a cross-sectional view taken along the line 15—15 in FIG. 14.
Figure 16:
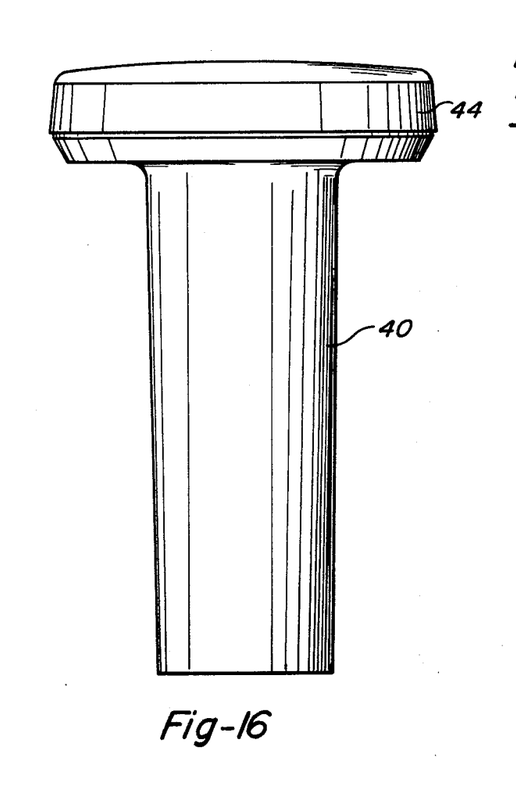
FIG. 16 is a side elevational view of a plunger included in the grinder of FIG. 1.
Figure 17:
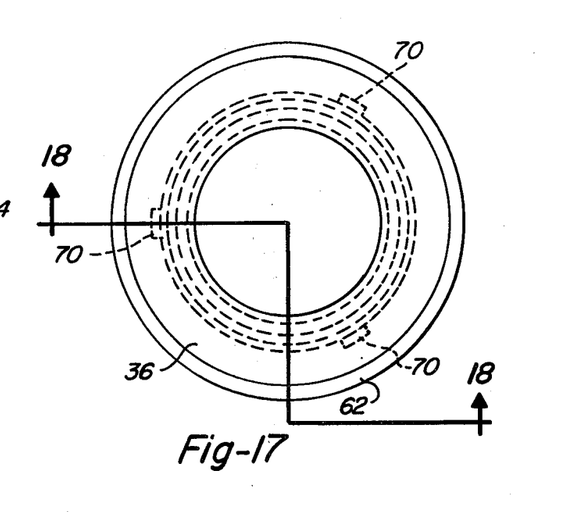
FIG. 17 is a top plan view of a barrel which is a still further component of the grinder of FIG. 1.
Figure 18:
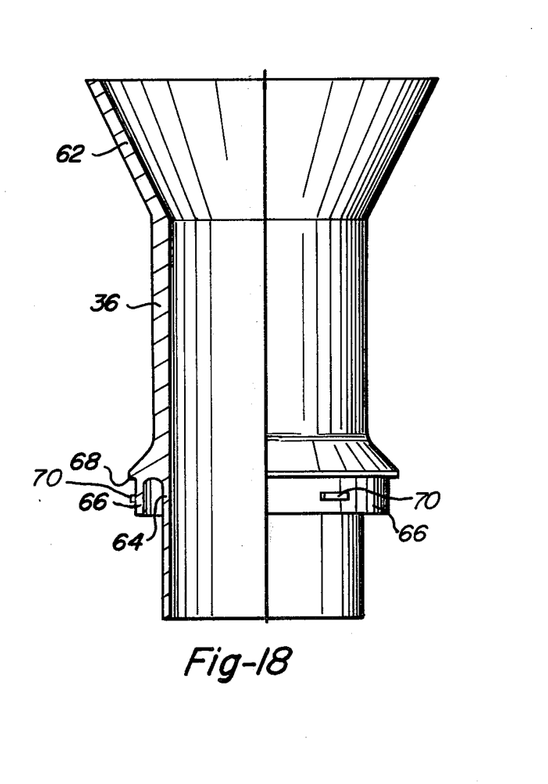
FIG. 18 is a cross-sectional view taken along the line 18—18 in FIG. 17.

Base unit 30 is composed of an upper or main housing portion 50 and a lower portion or bottom cover 52. The two portions are secured together by means of suitable screws 54 as best seen in FIG. 9. Louvers 56 in bottom portion 50 serve to permit ventilation for a motor contained within base unit 30 as well as to enable the escape of any liquid which, by condensation or otherwise, might tend to collect within the base unit. Secured to the bottom of lower portion 52 are feet 58 and 60 of rubber or the like for supporting the entire unit upon a flat surface such as a counter.

Food tube 36 flares outwardly at its upper end portion 62 in order more conveniently to permit the placement of foodstuff within the tube. Encircling a lower portion 64 of tube 36 is a peripheral and downwardly-depending skirt 66 that seats within well 38 and has an upper shoulder 68 that rests on the upper margin of well 38. Circumferentially-spaced-around and projecting outwardly from skirt 66 are three keys 70 that are individually received within respective different ones of keyways 72 located in the upper inner wall portion of well 38. Thus, tube 36 may be lockingly seated into well 38, and skirt 66 together with shoulder 68 serve to inhibit any tendency of foodstuff to escape from well 38 during operation. Peripherally encompassing the bottom margin of well 38 are a plurality of circumferentially-spaced slots 74 and 76 that serve as drain holes.

Grinding mechanism 42 includes a cutter plate 78 and a cutter gear or wheel 80. Plate 78 has a plurality of apertures 82 for extruding ground foodstuff under pressure exerted by plunger 40. A central aperture 84 in plate 78 journals a bearing 86 located centrally in cutter gear 80. Cutter gear 80 is composed on an externally-toothed ring gear 88 having a diametrically disposed cutter blade 90 positioned in operation to sweep over the upper end of apertures 82 and cause comminution of the foodstuff. Three circumferentially spaced tabs 92 on plate 78 are received within slots 94 correspondingly spaced around the internal periphery of well 38. Cutter gear 80 is then placed into position simply by dropping it into well 38 so that bearing 86 is received within journaling aperture 84.

The consistency of the ground material is, of course, determined by the sizes of apertures 82. In order to allow selective variation in that consistency, it is contemplated that the grinder be supplied with several different ones of plates 78 each having respective different aperture sizes. These additional ones of the apertured plates not in use at any given time conveniently may be stored by insertion within an indentation 94', formed into the bottom panel of lower portion 52 of the base unit and therein held in place by means of resilient clip 96.

Directly driving ring gear 88 in rotation is a spur gear 98 journaled between the top and bottom walls of cassette 32. Coupled to but spaced above gear 98 is another spur gear 100 which receives the transmission of the motion from a delivery system yet to be described. The vertical separation between gears 98 and 100 tends to further inhibit the passage of any leakage of foodstuff from the vicinity of cutter gear 80 into that delivery system.

Figure 19:
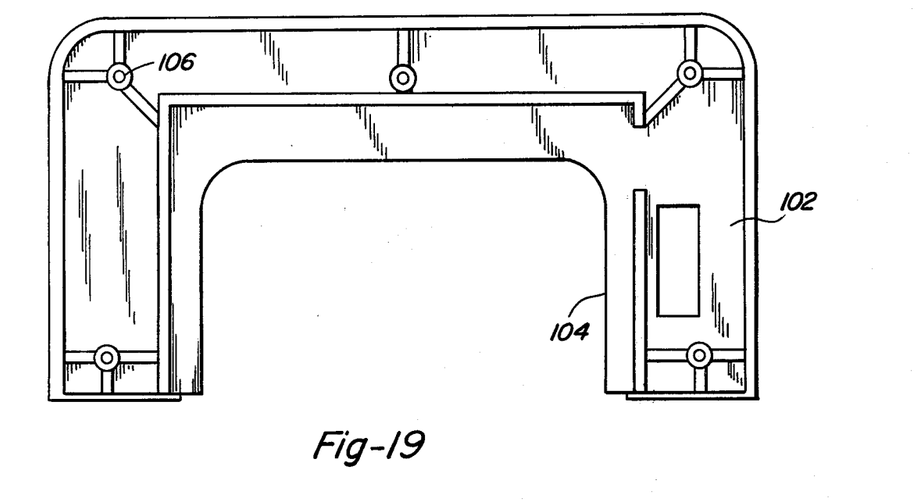
FIG. 19 is a top plan view of an upper portion of the base unit of the grinder shown in FIG. 1.
Figure 20:
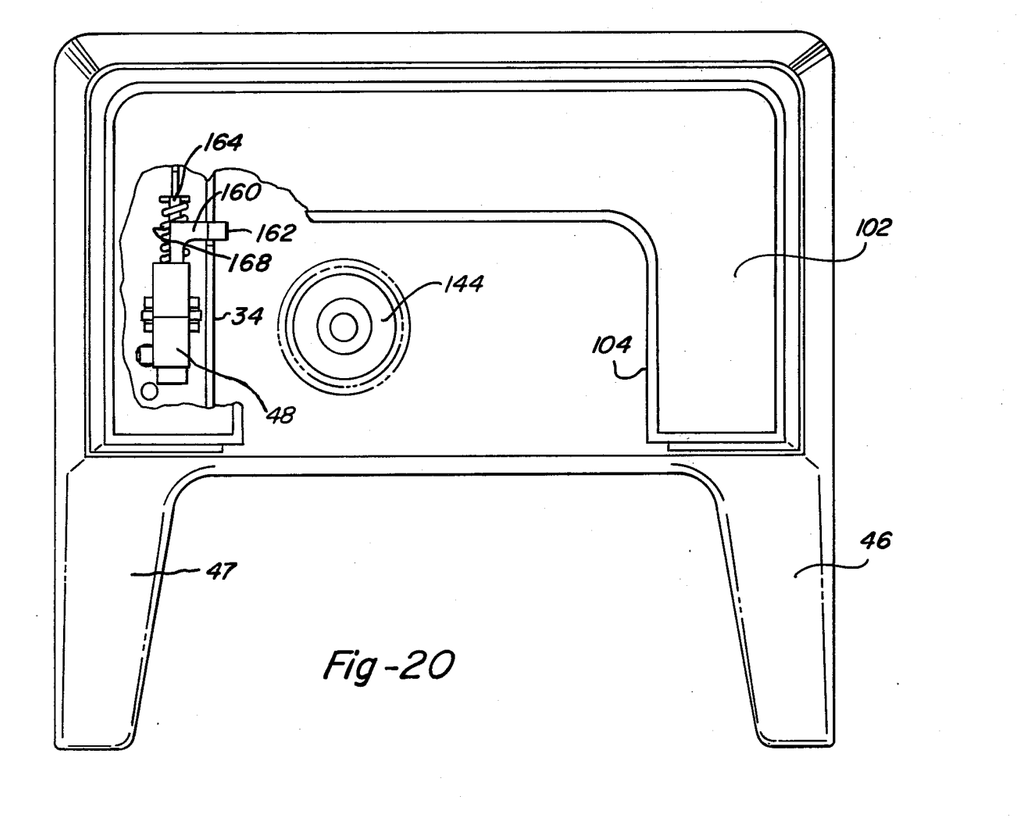
FIG. 20 is a top plan view of that same base unit.
Figures 21, 21A:
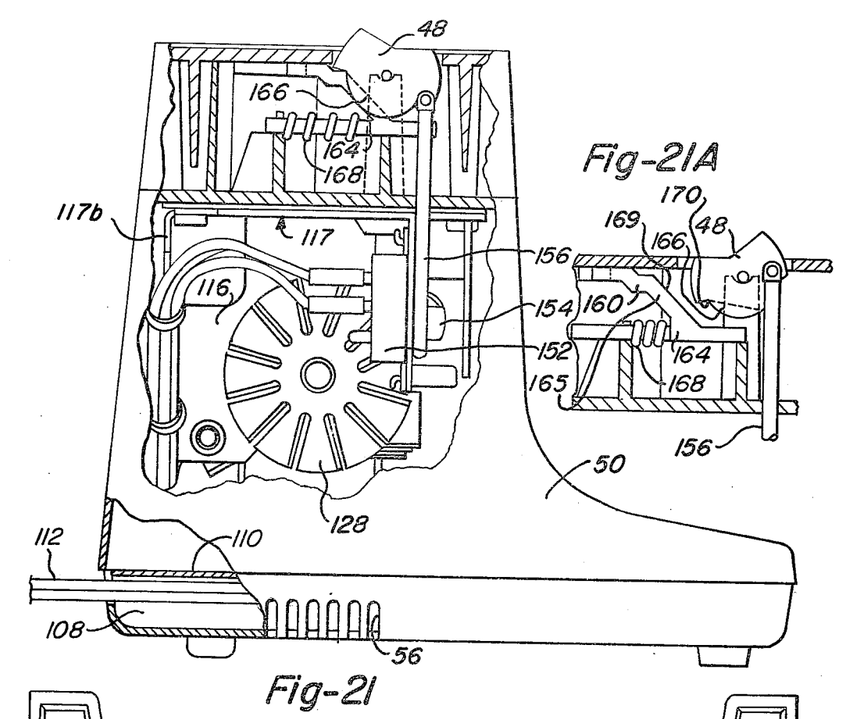
FIG. 21 is a side elevational view; partially broken away, of the upper portion of that base unit.
FIG. 21A is a fragmentary cross-sectional view of a portion of FIG. 21 with certain parts in a different position.
Figure 22:
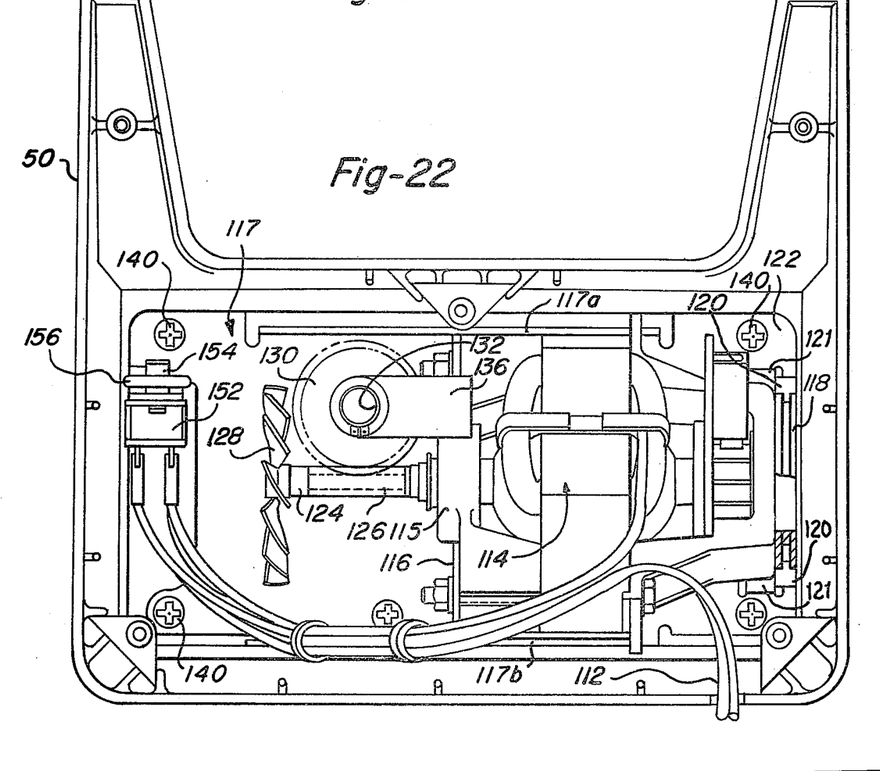
FIG. 22 is a bottom plan view of the base unit as shown in FIG. 9 but with the bottom portion of that base unit removed.
Figure 23:
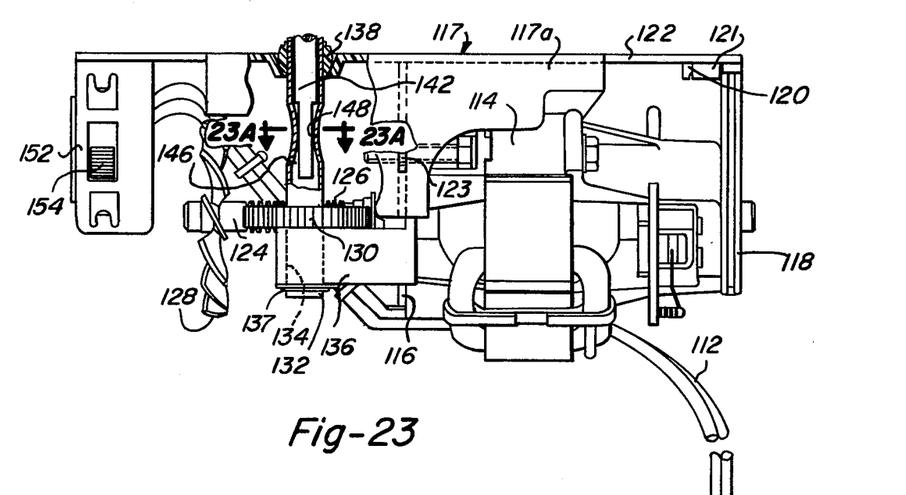
FIG. 23 is a side elevational view of a motor assembly included within the aforementioned base unit.
Figure 23A:
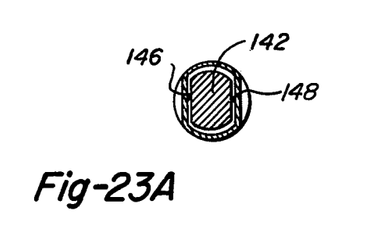
FIG. 23A is an enlarged fragmentary cross-sectional view taken along the line 23A—23A in FIG. 23.
Figure 24:
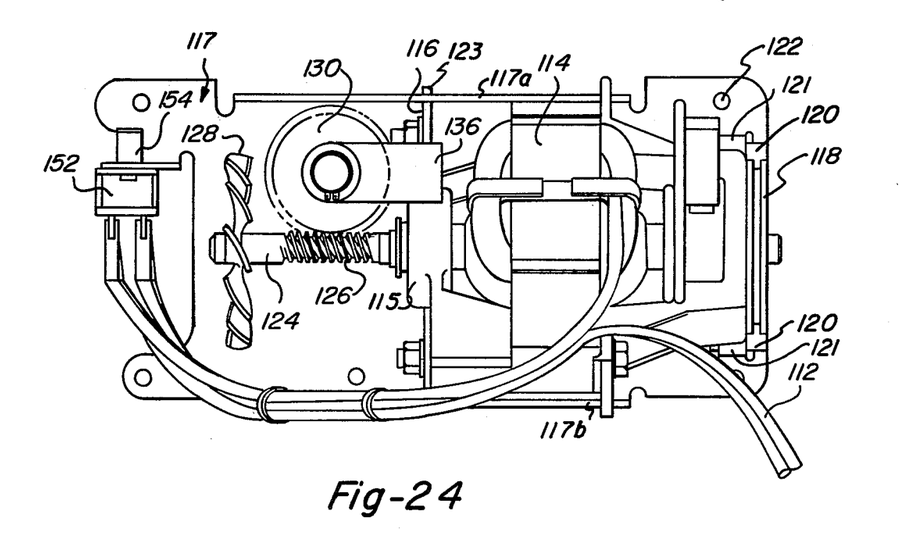
FIG. 24 is a bottom plan view of that same motor assembly.

As shown in FIG. 19, a top portion 102 of base unit 30 is in the form of a cover which has an indentation 104 corresponding with receptacle 34. Suitable bosses, as at 106, are included for the receipt of mounting screws. A compartment 108, disposed centrally in lower portion 52 of the base unit, closed by a cover member 110, serves as a place for storage of an electrical power cord 112.

Within base unit 30 is a motor assembly which includes an electric motor 114 having its motive output journaled in a bearing the housing 115 of which is secured to a vertical wall 116 disposed immediately within the main cavity defined interiorly of base unit 30. Wall 116 is rigidly secured in place to a bracket 117. At the other end of motor 114, there is a U-shaped resilient strap 118 snapped into place so as to have the feet 120 on its legs engaged under tongues 121 formed in a base 122 of bracket 117 and thereby to protect against undue deflection of the motor unit upon possible dropping of the food grinder. Bracket 117 includes opposed walls 117a and 117b projecting from base 122 and between which wall 116 is secured as indicated at 123 by staking.

The drive shaft 124 of motor 114 includes a worm 126 beyond which is a venilating fan 128. Worm 126 directly drives a gear 130 secured near one end of a hollow shaft 132 the adjacent outer end of which is journaled in an assemblage that includes a sleeve bearing 134 formed in an ear 136 that projects outwardly from bearing housing 115. Shaft 132 is secured against longitudinal movement by means of a C-washer 137 seated in a corresponding circumferential groove.

Near its upper end, shaft 132 is seated within another assemblage which includes a spherical or universal-type bearing 138 beyond which the terminal upper end of shaft 132 projects upwardly into receptacle 34. The entire assembly, including motor 114 and the supporting structure that includes ear 136, is mounted from bracket 117 which, in turn, is affixed by screws 140 on the underside of receptacle 34 and at the top of the compartment formed within the major portion of base unit 30.

The combination of sleeve bearing 134 and spherical bearing 138 insures that, during assembly, gear 130 will properly align with worm 126.

Removably received within shaft 132 is a spindle 142 on the upper end of which is located a spur gear 144 that, in the use of the grinder, mates with gear 100 within cassette 32. Spindle 142 is necked down and flattened as at 146 in its lower end portion so as to seat within a restriction 148 formed in the midportion of shaft 132 and thereby to lock spindle 142 to shaft 132 for rotation when the spindle and gear 144 it carries are dropped into place. A slot 150 is formed into the bottom wall of cassette 32 so as to receive the upper end portion of shaft 132, spindle 142 for the associated mounting of bearing 138 and shaft 132. When cassette 32 is inserted into receptacle 34, gear 144 engages gear 100 so as to deliver motion to cutter gear 80. Another slot 150a in the cassette bottom wall slips around an upright split boss 151 adjacent to the rear of receptacle 34 and located to be gripped by a notch 151a to resist removal of the cassette from the receptacle.

Electrical power supplied for energization of motor 114 is fed through a switch 152. Switch 152 includes an actuator knob 154. Knob 154 is moved between on and off positions by means of an arm 156 which at one end engages knob 154 and at the other end is pivotally connected to an appropriate portion of switch operator 48.

Associated with switch operator 48 is an arrangement for disabling its operation in the absence of cassette 32 seated within receptacle 34. To that end, a lever 160 has one end 162 projecting into receptacle 34 for engagement by cassette 32 upon its insertion into place. The other end of lever 160 is integrally connected to a bar 164 by an arm 165 so disposed with respect to a cam seat 166, formed into the underside of operator 48, as to prohibit operation of the switch operator to energize motor 114 unless cassette 32 is properly in place. To this end, bar 164 is biased by a compression spring 168. When cassette 32 is removed while the motor is running, a cam 169 on arm 165 is moved by spring 168 to throw switch operator 48 into the "off" position by pressure against an abutment 170 also on the underside of operator 48.

It will be observed that all electrical components are confined with the base unit. Operation of the driving system is disabled unless the cassette is properly in place. Clean up after use is greatly facilitated because only the plunger, food tube and grinding mechanism normally are subjected to the foodstuff. When necessary, the cassette also may be cleaned without any necessity of having to be involved in cleaning of the base unit. At most, it is only necessary to wipe the exposed gear within the receptacle from time to time. The totality of the overall arrangement is such as to admit to economical manufacture. The drive chain is such as to add to that economy by avoiding problems with alignment of different subcomponents.

While a particular embodiment of the invention has been shown and described, it will be obvious to those skilled in the art that changes and modifications may be made without departing from the invention in broader aspects, and, therefore, the aim in the appended claims is to cover all such changes and modifications as fall within the true spirit and scope of the invention.

We claim:

1. A food grinder comprising:
   an upstanding base unit;
   a motor mounted within said base unit;
   delivery means, separate from said motor but coupled thereto, mounted within said base unit for transmitting motion from said motor;
   means in said base unit defining a receptacle having a horizontally-facing opening, an output portion of said delivery means extending into said receptacle;
   cassette means, including a food grinding mechanism, removably receivable within said opening of and into said receptacle for receiving motion from said delivery means to operate said mechanism only upon proper placement of said cassette means;
   a portion of said cassette means including said mechanism projecting horizontally outward from said base unit, and a motion transmitting portion of said grinding mechanism projecting toward and into coupling relationship with said output portion of said delivery means, when said cassette means is mounted within said receptacle;
   and said cassette means including a vertically-oriented stationary well with the food processing portions of said grinding mechanism entirely being removably seated in said well upon insertion into the upper end of said well.

2. A food grinder as defined in claim 1 in which said receptacle and cassette means are spaced above the bottom of said base unit and in which mutually spaced feet project outwardly from the bottom of said base unit beneath said cassette to define a space for receiving a container located beneath said mechanism.

3. A food grinder as defined in claim 1 in which said grinding mechanism includes an apertured plate seated against rotation in the bottom of said well and a cutter wheel positioned in said well atop and seated in said plate and having a cutter blade positioned to sweep across the apertures in said plate, said wheel being arranged to rotate in response to receipt of motion from said delivery means.

4. A food grinder as defined in claim 1 in which a tube open at both ends is removably seated at one end within said well immediately atop said grinding mechanism and which further includes a plunger slidable into the other end of said tube and entirely therethrough for urging food within the barrel defined by said tube into said grinding mechanism.

5. A food grinder as defined in claim 4 in which the lower end of said tube includes means for lockingly engaging with said cassette means.

6. A food grinder as defined in claim 4 in which the lower end portion of said tube projects within said well a distance sufficient to inhibit the passage of foodstuff toward said delivery means.

7. A food grinder as defined in claim 1 and which includes means in said cassette means for inhibiting the passage of foodstuff from said grinding mechanism toward said delivery means.

8. A food grinder as defined in claim 7 in which said inhibiting means includes a first gear driving said mechanism and a second gear, coupled to but spaced above said first gear, for receiving motion from said delivery means.

9. A food grinder comprising:
   an upstanding base unit;
   a motor mounted within said base unit;
   delivery means, separate from said motor but coupled thereto, mounted within said base unit for transmitting motion from said motor;
   said delivery means including a worm driven by said motor;

a gear driven by said worm;
a spindle upon which said gear is mounted;
a journal for said spindle on one side of said gear with said journal being mounted on a first assemblage;
and a universally-seated bearing for said spindle on the other side of said gear with said bearing being mounted on a second assemblage of said grinder;
means in said base unit defining a receptacle having a horizontally-facing opening;
cassette means, including a food grinding mechanism, removably receivable within said opening of said receptacle for receiving motion from said delivery means to operate said mechanism only upon proper placement of said cassette means;
a portion of said cassette means including said mechanism projecting horizontally outward from said base unit when said cassette means is mounted within said receptacle;
and said cassette means including a vertically-oriented well with said grinding mechanism being removably seat in said well.

10. A food grinder comprising:
an upstanding base unit;
a motor mounted within said base unit; said motor being secured at one end to said base unit by a rigid assemblage mounted thereto, and the other end of said motor being secured to said base unit by means of a snap-in resilient support member;
delivery means, separate from said motor but coupled thereto, mounted within said base unit for transmitting motion from said motor;
means in said base unit defining a receptacle having a horizontally-facing opening;
cassette means, including a food grinding mechanism, removably receivable within said opening of said receptacle for receiving motion from said delivery means to operate said mechanism only upon proper placement of said cassette means;
a portion of said cassette means including said mechanism projecting horizontally outward from said base unit when said cassette means is mounted within said receptacle;
and said cassette means including a vertically-oriented well with said grinding mechanism being removably seated in said well.

11. A food grinder comprising:
an upstanding base unit;
a motor mounted within said base unit;
delivery means, separate from said motor but coupled thereto, mounted within said base unit for transmitting motion from said motor;
means in said base unit defining a receptacle having a horizontally-facing opening, an output portion of said delivery means extending into said receptacle;
cassette means, including a food grinding mechanism, removably receivable within said opening of and into said receptacle for receiving motion from said delivery means to operate said mechanism only upon proper placement of said cassette means;
a portion of said cassette means including said mechanism projecting horizontally outward from said base, and a motion transmitting portion of said grinding mechanism projecting toward and into coupling relationship with said output portion of said delivery means, when said cassette means is mounted within said receptacle;
said cassette means including a vertically-oriented stationary well with the food processing portions of said grinding mechanism entirely being removably seated in said well upon insertion into the upper end of said well;
said grinder further including means in said base unit for disabling activation of said motor upon removal of said cassette means from said base unit;
a manually operable switch in said base unit for controlling operation of said motor;
and said disabling means being arranged to block operation of said switch upon said removal of said cassette means.

12. A food grinder comprising:
an upstanding base unit;
a motor mounted within said base unit;
delivery means, separate from said motor but coupled thereto, mounted within said base unit for transmitting motion from said motor;
means in said base unit defining a receptacle having a horizontally-facing opening, an output portion of said delivery means extending into said receptacle;
cassette means, including a food grinding mechanism removably receivable within said opening of and into said receptacle for receiving motion from said delivery means to operate said mechanism only upon proper placement of said cassette means;
a portion of said cassette means including said mechanism projecting horizontally outward from said base unit, and a motion transmitting portion of said grinding mechanism projecting toward and into coupling relationship with said output portion of said delivery means, when said cassette means is mounted within said receptacle;
said cassette means including a vertically-oriented stationary well with the food processing portions of said grinding mechanism entirely being removably seated in said well upon insertion into the upper end of said well;
said grinding mechanism including an apertured plate seated against rotation in the bottom of said well and a cutter wheel positioned in said well atop and seated in said plate and having a cutter blade positioned to sweep across the apertures in said plate, said wheel being arranged to rotate in response to receipt of motion from said delivery means;
said plate including a centrally-located aperture; and a centrally-located bearing on said wheel journaled within said aperture.

* * * * *